United States Patent [19]

Cleveland et al.

[11] 3,976,840
[45] Aug. 24, 1976

[54] PORTABLE SECURITIES SELECTOR SYSTEM

[75] Inventors: Spencer Cleveland, San Francisco; Fred F. Coury, Sunnyvale, both of Calif.

[73] Assignee: Spencer Cleveland, San Francisco, Calif.

[22] Filed: July 14, 1975

[21] Appl. No.: 595,461

[52] U.S. Cl. ............................. 179/2 DP; 179/2 C; 179/179; 340/152 T
[51] Int. Cl.² ........................................ H04M 11/00
[58] Field of Search ................. 179/1 C, 2 C, 2 CA, 179/2 DP, 6 AC, 29, 100 R, 100 C, 178, 179

[56] References Cited
UNITED STATES PATENTS

| | | | |
|---|---|---|---|
| 2,684,996 | 7/1954 | Potts | 179/2 DP |
| 3,516,062 | 6/1970 | Spraker | 179/2 DP |
| 3,657,479 | 4/1972 | Sweenie et al. | 179/1 C |
| 3,716,835 | 2/1973 | Weinberg et al. | 179/2 DP |
| 3,757,048 | 9/1973 | McAvoy et al. | 179/2 DP |
| 3,865,994 | 2/1975 | Bender | 179/2 DP |
| 3,870,821 | 3/1975 | Steury | 179/2 DP |

FOREIGN PATENTS OR APPLICATIONS

| | | | |
|---|---|---|---|
| 1,762,551 | 5/1970 | Germany | 179/2 DP |

OTHER PUBLICATIONS

*Computer Decisions* Nov. 1969 p. 72 "Batteries Power Acoustic Terminal".

*IBM Technical Disclosure Bulletin* "Walle. Terminal Keyboard with Acoustic Coupler" M. F. Davis et al. vol. 10 No. 3 Aug. 1967 pp. 188–189.

*Primary Examiner*—George G. Stellar
*Attorney, Agent, or Firm*—Townsend and Townsend

[57] ABSTRACT

A system for enabling securities information to be elicited and transactions to be automatically executed by an investor from a conventional telephone. A portable pocketsized data terminal having a keyboard, a display and status indicator lamps includes an acoustic coupler device for removable attachment to a telephone handset. A centralized computer receives information signals originating with the portable data terminal and specifying information or transaction execution requests, and transmits appropriate responses to the portable data terminal for display. Several levels of security are provided in the system.

13 Claims, 7 Drawing Figures

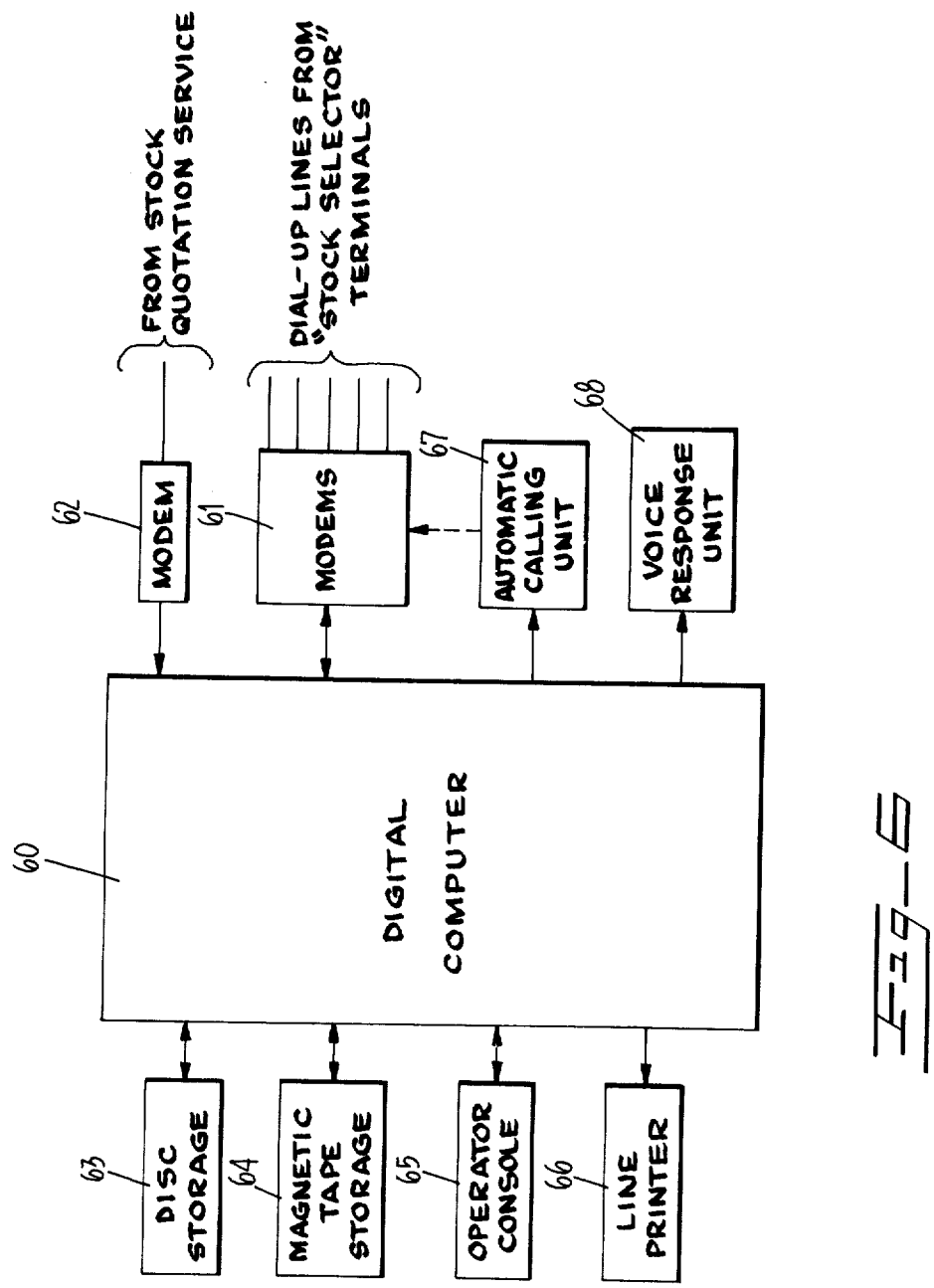

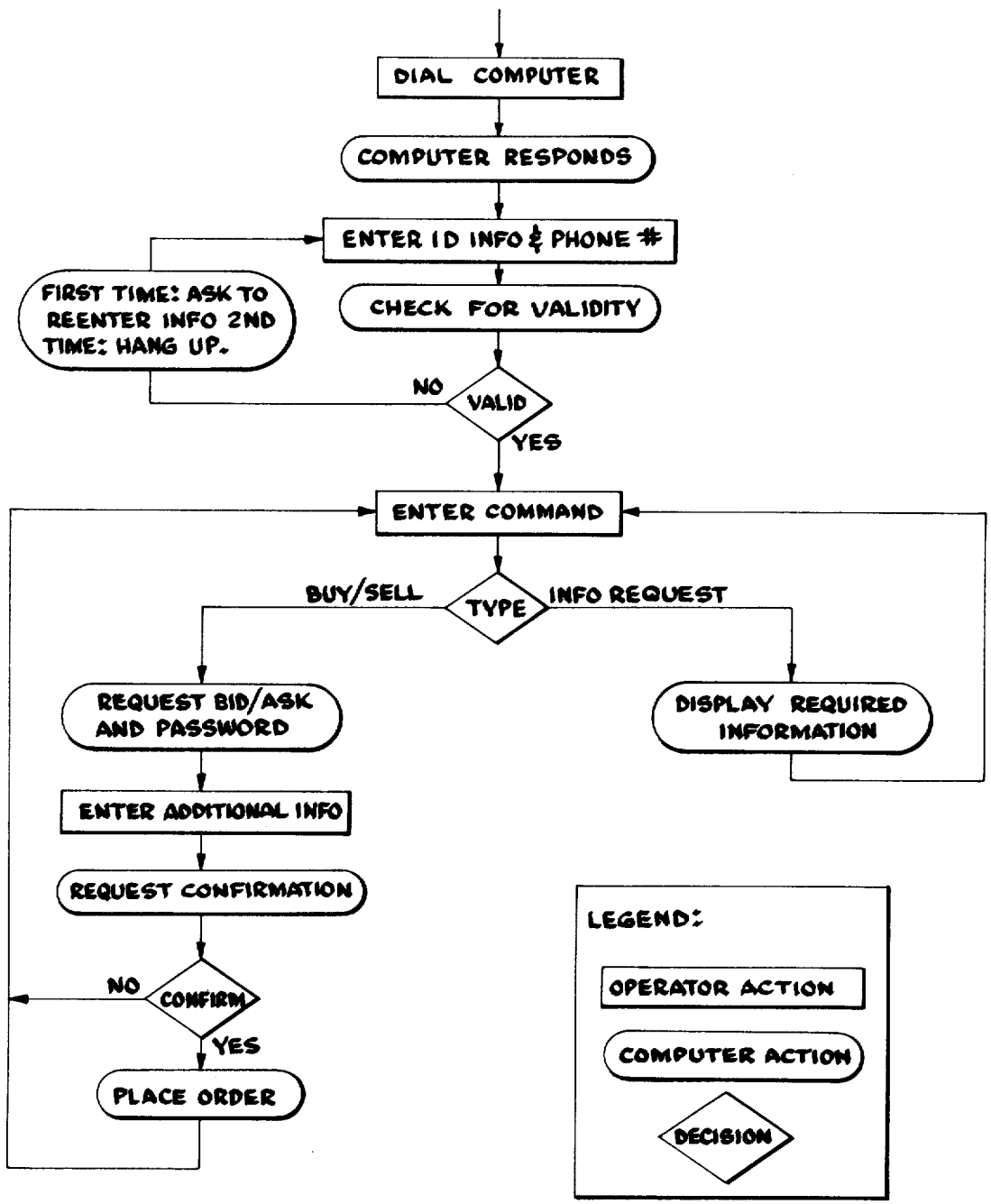

PORTABLE SECURITIES SELECTOR SYSTEM

BACKGROUND OF THE INVENTION

This invention relates to bidirectional communication systems for transmitting information over telephone lines. More particularly, this invention relates to systems for bidirectionally transmitting information between a remote site and a central location and is specifically directed to a system for enabling securities information to be requested, and securities transactions to be automatically executed, both via telephone.

Many systems are known which are capable of transmitting information between a conventional telephone handset at a remote location and a computer installation at a central location. Such systems typically include a desk console unit provided with a conventional acoustic coupling mechanism which enables manually generated data to be converted into electronic signals having parameters which are compatible with the transmission capabilities of conventional telephone lines. Such installations are advantageous in that they require no permanent connection between the remote data terminal and the remote telephone lines, and thus are convenient to install and operate. With advancing technology the physical size of such units has been reduced to truly portable size, such as the MCM portable data terminal sold by Micon Industries of Oakland, California.

In the specific field of the securities industry, systems of this type are known and are used to garner information relating to securities transactions, e.g. the volume of securities sold on a specific exchange on a given day, the current selling price for a given security, the bid and ask price for securities traded over the counter, and other information of interest to investors. As used herein, the term "securities" includes corporate stocks, bonds, options, commodities, and other choses in action representing ownership of businesses or commodities and evidenced by certificates. Such securities have standard alpha symbols recognizable by investors as specifying those securities, e.g. GM for General Motors, ATT for American Telephone and Telegraph, etc.

In a typical securities information request/supply service, of which the MARKET LINE system is representative, a securities information request is originated by the user by endigiting a unique numeric code which identifies the given security into a desk console unit by means of a numeric keyboard. The information request is electronically formated and converted into acoustical signals by the desk unit. The acoustical signals are coupled to a telephone handset, converted to electrical signals by the telephone handset and transmitted by standard telephone lines to a central computer. Upon receipt, the computer performs a table look up of the information and transmits electrical signals representative of this information over the telephone lines to the telephone handset, where the signals are converted to acoustical signals and coupled to the desk unit. The acoustic signals are converted to electrical signals by the desk console unit, and are formatted and displayed on a visible display device. While such systems are useful in providing relatively current information regarding securities in general, they suffer from the disadvantage that given securities must be specified by a purely numeric code. Thus, rather than entering the ordinary alpha securities symbols, with which the many investors are familiar—as may be done for example, with the hard-wired TELEQUOTE III system supplied by Bunker-Ramo Company,—a unique numeric multi-digit code must be endigited by the user to request the desired information. This requires that the user either memorize those codes corresponding to securities of interest, or carry the code book on his person, either of which can cause substantial inconvenience to the investor. More importantly, in spite of the existence of relatively sophisticated bidirectional data communication systems employing telephone lines and acoustic couplers, no system has yet been devised which enables an investor to automatically effect securities transactions from a home or business telephone. Thus, to date it is still necessary to personally contact an authorized representative of a brokerage house, either in person or via the telephone, the telegraph or by letter, in order to execute a transaction involving securities. This requires the personal presence and efforts of a licensed representative of the brokerage house, which adds an unnecessary cost component to the price of the transaction. Moreover, estimates have indicated that nearly 5% of all securities transaction orders placed with brokerage houses are erroneously executed due to human error in processing such orders. In addition, execution of orders is frequently delayed by human factors. Also, trading periods during which securities transactions may be effected are severely limited to the five normal working days of the week and to a few hours of each trading day. All of the above factors tend to restrict, and frequently result in complete loss of, profit opportunities.

SUMMARY OF THE INVENTION

The invention comprises an automated system for permitting securities information to be elicited and transactions to be executed by an individual investor via a telephone which eliminates the requirement for personal contact with a representative of a brokerage house, which permits a specific transaction to be executed substantially instantaneously, and which includes an internal security procedure for aborting invalid attempts to illegally conduct transactions.

The invention includes a centralized computer having a memory containing current information relating to pricing and volume information regarding securities which are actively traded, and remote communication means for communicating via conventional telephone lines with the centralized computer in order to elicit such information and to effect transactions involving such securities. The remote communication means comprises a pocketsized portable device having an acoustic coupling mechanism conformable with a conventional telephone handset, a manually operable alphanumeric keyboard for specifying particular securities by their conventional symbols and the nature of a desired information request or securities transaction, an electronic system physically embodied in integrated circuit form for processing manually encoded information into electronic signals for transmission to the centralized computer and for processing data received from the computer, a visible display unit for providing a visible indication of manually specified information and information received from the centralized computer, and a self-contained power source for providing electrical power to the components within the portable device.

The portable unit includes a microprocessor, a programmed read only memory for directing operation of the microprocessor, and means for synchronizing the operation of the microprocessor, ROM, keyboard, optical display and the acoustical interface components. Optionally included is a second read only memory unit having a security code stored therein and which is detachable from the portable unit so that the device is rendered inoperative unless the key read only memory unit is physically attached thereto.

In use, the portable unit is physically attached to a conventional telephone handset, activated by manually operating a power switch and coupled to the centralized computer by calling a specific telephone number. After a preliminary identity check procedure, desired information is manually encoded by means of the alpha numeric keyboard on the portable unit and transmitted to the centralized computer. In response to a request for information, the computer performs a table lookup of the requested information, merely transmits this information to the portable unit at the remote location via the telephone lines and this information is visually displayed to the user. In response to a request for execution of a securities transaction, e.g. buy or sell, the computer permanently stores such a request and alerts an operator by means of a hard-copy printout. After execution, the transaction is verified to the user either immediately and automatically by the computer or after a suitable interval, e.g. 30 minutes, by a human operator.

In addition to the key read only memory unit provided for security purposes, an additional level of security is optionally provided in the system to prevent fraudulent transactions. In response to a request for an active transaction, e.g. buy or sell, the centralized computer automatically disconnects the communication link, performs a table look-up of a specific telephone number associated with the particular portable unit, which is identified by a unique manually endigited code, and automatically calls back the unit at the specified telephone number. In this manner, an unauthorized user of a stolen unit is incapable of consummating a particular transaction.

The portable unit is also optionally provided with a conventional electronic calculator which is accessible by means of certain ones of the alpha numeric keys.

For a fuller understanding of the nature and advantages of the invention, reference should be had to the ensuing detailed description taken in conjunction with the accompanying drawings.

BRIEF DESCRIPTION OF THE DRAWINGS

FIG. 6 is a block diagram of a centralized computer configured for use with the portable unit of FIG. 1; and FIG. 7 is a flow chart illustrating the operation of the system.

DESCRIPTION OF THE PREFERRED EMBODIMENTS

Figure 1:
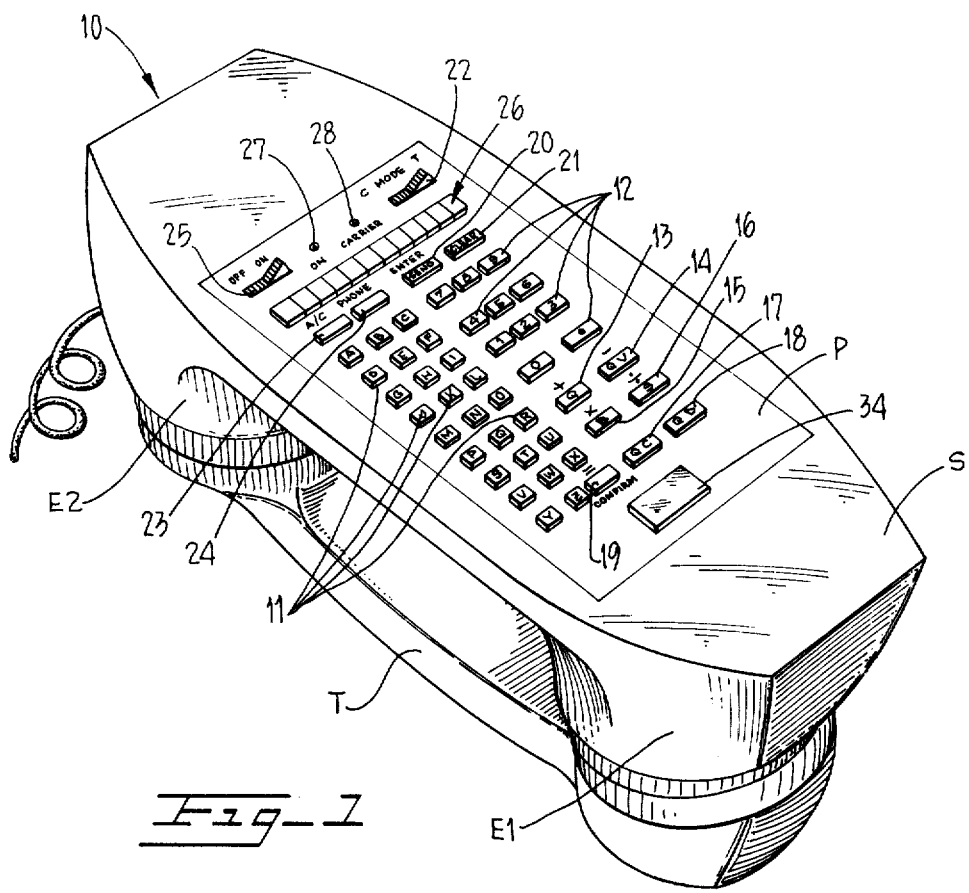
FIG. 1 is a perspective view of a portable unit constructed according to the invention.

Turning now to the drawings, FIG. 1 is a perspective view of a portable unit constructed according to the invention. Portable unit 10 comprises a housing having a control panel portion P located on a facing surface S of housing and a pair of end portions $E_1$, $E_2$ extending away from the facing surface S for housing conventional acoustic transducing elements and mufflers, e.g. the acoustic coupler disclosed in U.S. Pat. No. 3,585,302, the disclosure of which is hereby incorporated by reference. End portions $E_1$ and $E_2$ are laterally spaced by a distance substantially equal to the lateral spacings between the transmitter and receiver portions of a telephone handset T so as to be physcially conformable therewith in order that portable unit 10 may be physcially coupled to the telephone handset T in the position illustrated in FIG. 1 when in use. As will be appreciated by those skilled in the art, the physical dimensions of portable unit 10 are sufficiently small to enable the unit to be portably carried by a user in a coat pocket, in a brief case, or the like.

Figure 2:
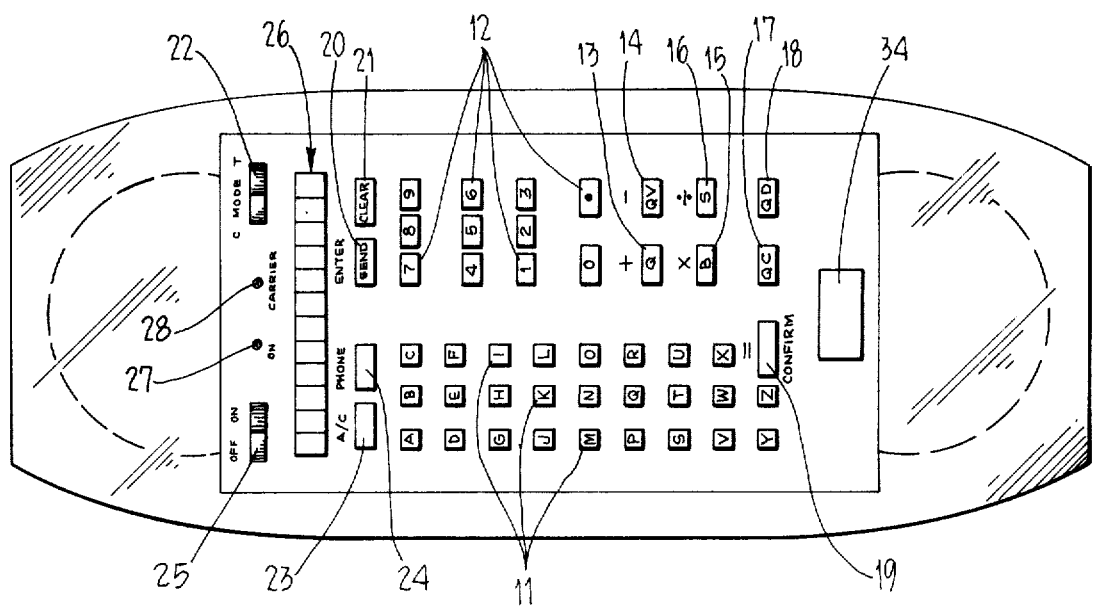
FIG. 2 is a plan view of the portable unit showing the keyboard, visible display unit and control elements.

As best seen in FIG. 2, the control panel portion of portable unit 10 includes an alpha-numeric keyboard including a full set of alphabet keys 11, a set of digit keys 12 for the digits 0–9 and decimal point, a plurality of special purpose function keys 13–24, an on-off switch 25, a 12 character alpha numeric LED display unit 26 and a pair of indicator lamps 27, 28, which may comprise light emitting diodes, for indicating power on and carrier status.

The alpha numeric keyboard permits manual entry of both alphabetic and numeric information into the portable unit 10 and may comprise any one of a number of known keyboard structures, preferably of the type currently employed in pocketsized electronic display calculators. Since such keyboards are well known, further description of the structural details thereof is omitted to avoid prolixity.

Portable unit 10 may be operated in either a calculator mode or a terminal mode by manual operation of mode switch 22. In the calculator mode, numeric keys 12 permit manual data entry, keys 13–16, 19 and 21 specify the add, subtract, multiply, divide, equals and clear functions, and enter/send key 20 specifies data entry. Entered data and computational results are displayed by display unit 26.

When operated in the terminal mode, the alpha keys 11 permit entry of any one of the conventional standard securities symbols employed in the industry, while the numeric keys enable entry of specific pricing information in the manner described more fully below. Entered data is displayed by LED display unit 26 to provide visual confirmation of manual data entries. In addition, LED display 26 provides a visual indication of information transmitted to the portable unit from the centralized location. In the terminal mode, function keys 13–22 specify the function requested by the user, with the functions corresponding as follows:

| KEY NO. | KEY SYMBOL | FUNCTION |
| --- | --- | --- |
| 13 | Q | Display latest available price for specified security |
| 14 | QV | Display latest available total volume of day's transactions of specified security |
| 15 | B | Buy |
| 16 | S | Sell |

| KEY NO. | KEY SYMBOL | -continued FUNCTION |
|---|---|---|
| 17 | QC | Display closing price for the specified security on the prior day |
| 18 | QD | Display opening price of specified security for today |
| 19 | CONFIRM | Transaction confirmed |
| 20 | ENTER/SEND | Send order to computer |
| 21 | CLEAR | Clear entered data |
| 22 | MODE | Specifies calculator or terminal mode |
| 23 | A/C | Following data is user account number |
| 24 | PHONE | Following data is authorized transaction phone number |

Figure 3:
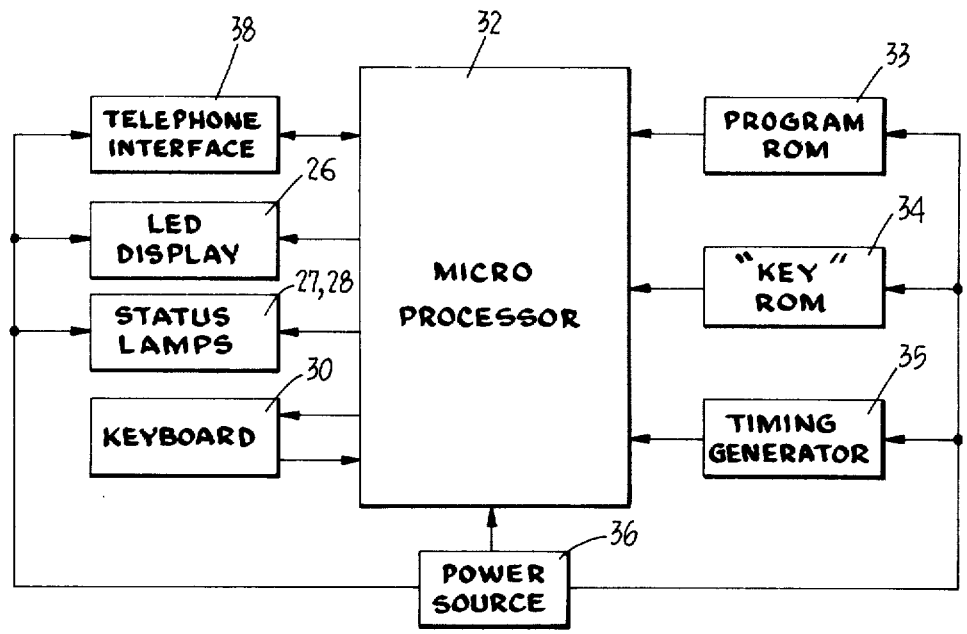
FIG. 3 is a block diagram of the system embodied in the portable unit of FIG. 1.

FIG. 3 shows a block diagram of the electronic system embodied in portable unit 10. Keyboard 30 provides data input to a conventional microprocessor 32 which is controlled by a programmed read only memory (ROM) 33. Microprocessor 32 may comprise any one of a number of known commercially available units, e.g. a Model 8080 Microprocessor available from Intel Corporation of Santa Clara, California, or a custom designed unit. Program ROM 33 is likewise a commercially available unit containing a series of steps or instructions for microprocessor 32. Key ROM 34 is an optional unit containing a user identification number and, as seen in FIG. 1, is physically detachable from portable unit 10. Microprocessor 32 is configured in such a manner that communication with the centralized computer, described below, is impossible unless key ROM 34 is physically attached thereto. A conventional timing generator 35 provides appropriate synchronizing signals for synchronizing the operation of the various units of the device, while power source 36 comprises a rechargeable battery or a conventional drycell battery.

Both LED display unit 26 and status lamps 27, 28 are coupled to the information output of processor 32, while telephone interface unit 38 comprises an acoustic transmitter and receiver couplable to the transmitter and receiver of a conventional telephone handset in the manner noted above.

In operation, microprocessor 32 scans keyboard 30, detects and debounces the electrical signals generated in response to key actuation and encodes the input signals into digital characters which are internally useable. Microprocessor 32 further presents information to LED display 26 and status lamps 27, 28, and provides all necessary strobe and select information. In addition, microprocessor 32 transmits and receives data via telephone interface unit 38 to a centralized computer. Microprocessor 32 further assembles keyboard input signals into commands, interprets these commands and executes the commands. The unit is capable of two basic modes of operation: terminal mode, and calculator mode.

In the calculator mode, microprocessor 32 is operated under control of ROM 33 as a conventional four function electronic calculator, with digit keys 12 enabling entry of numeric data, function keys 13–16 permitting specification of the customary four arithmetic functions, function keys 19–21 permitting specification of the usual equals, enter and clear functions, and LED display 26 displaying entered data and computational results. In the terminal mode, microprocessor 32 is operated under control of ROM 33 to assemble and display information for transmission to the centralized computer, with digit keys 12 enabling entry of numeric data and function keys 13–24 permitting specification of the special functions tabulated above. For example, when a given function key is depressed, digital character corresponding to the specified function is transmitted via the telephone lines to the centralized computer. In addition, data originating with the centralized computer is received, recognized by the microprocessor 32 and displayed by LED display 26. The onstatus indicator lamp 27 indicates whether power is being applied to the internal circuitry of the portable unit 10, while the carrier status indicator lamp 28 indicates whether a carrier signal is being received from the computer, which signal must be present for operation in the terminal mode.

Figure 4:
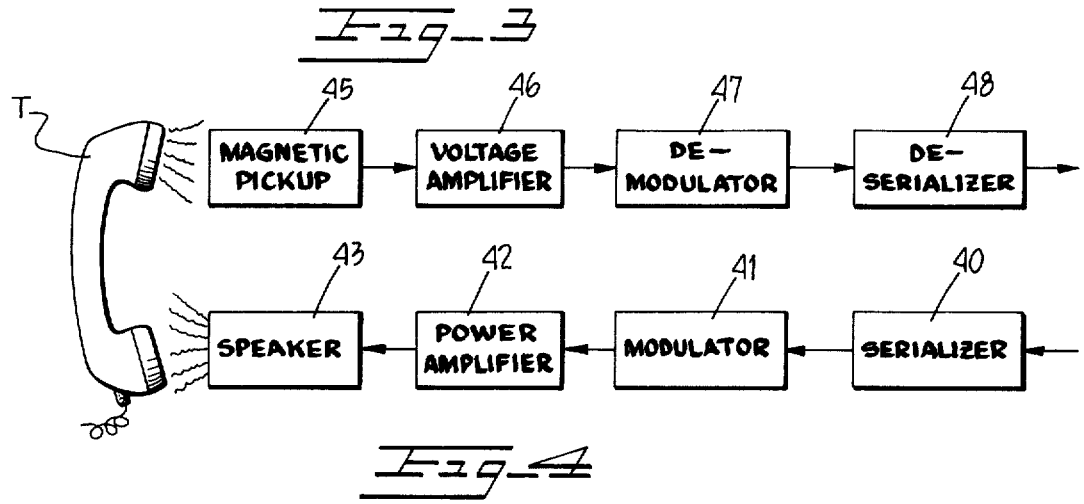
FIG. 4 is a block diagram of a portion of a first embodiment of the system embodied in the portable unit of FIG. 1.

FIG. 4 is a block diagram of a first embodiment of telephone interface unit 38. As shown in this Fig., a parallel to serial converter 40 coupled to the data output of microprocessor unit 32 is coupled to a conventional modem or modulator in which the digital data is converted to a variable frequency signal. The output of modulator 41 is amplified by a conventional power amplifier 42 and used to drive a speaker 43 which is acoustically coupled to the telephone handset transmitter. The telephone handset receiver is magnetically coupled to a magnetic pickup 45, or acoustically coupled to an acoustical pickup, the output of which is amplified in conventional voltage amplifier 46, demodulated by demodulator unit 47 and converted from serial to parallel form in serial to parallel converter 48. As will be appreciated by those skilled in the art, the parallel-to-serial and serial-to-parallel data conversion functions performed by converters 40 and 48 may be performed within microprocessor unit 32 by altering the instruction sequence stored in ROM 33, and converters 40 and 48 dispensed with, if desired.

Figure 5:
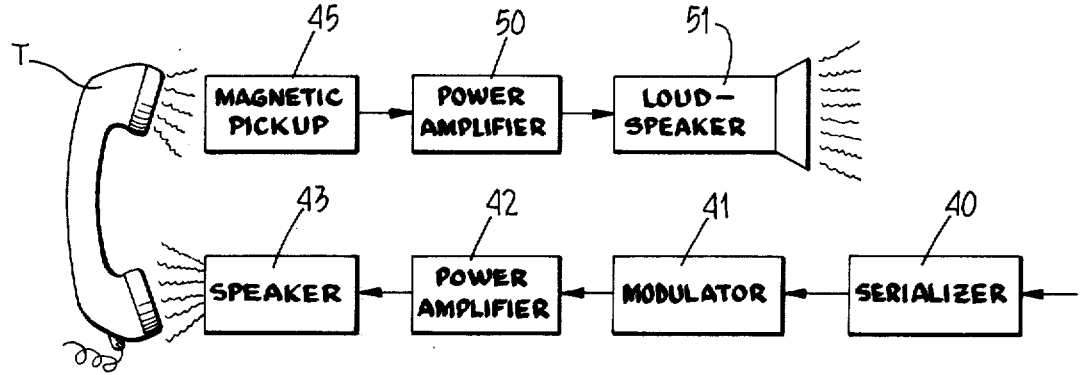
FIG. 5 is a block diagram of an alternate embodiment of the system and similar to FIG. 4.

FIG. 5 shows an alternate embodiment of telephone interface unit 38 which provides a voice response capability for portable unit 10. In this embodiment, the output of magnetic pickup 45 is coupled to a power amplifier 50 which drives a conventional loudspeaker 51 located in portable unit 10. As will be appreciated by those skilled in the art, the voice response capability of the FIG. 5 embodiment may be combined with the embodiment of FIG. 4, if desired in a particular application.

FIG. 6 illustrates a block diagram of the centralized computer with which the portable unit 10 is capable of communicating for the purpose of receiving information and also executing securities transactions. As shown in this Fig., communication to a digital computer 60 is accomplished via a plurality of modem units 61 which are coupled to individual incoming telephone lines. An additional modem 62 is coupled to a special telephone line from a stock quotation service, such as NASDAQ or other comparable source of securities information. Conventional peripheral units, e.g. a disk storage memory unit 63 for storing securities information, a magnetic tape storage unit 64 providing an information storage back-up capability, a operator console 65 for enabling operator control of the system, and a line printer 66 for providing permanent copies of transactions and information requests are all included in the central computer installation. Optionally, an automatic calling unit 67 for providing automatic dial back to the individual portable units 10 may be included, together with a voice response unit 68, if desired, for generating oral indications of information requests and securities transactions. Preferably, the central computer 60 and peripheral system are configured in such a manner that freshly entered data stored in disc storage unit 63 is copied into magnetic tape storage unit 64 at periodic intervals, for example, at hourly intervals.

In addition, the system is preferably provided with customary back-up units, such as an auxiliary disc storage unit 63, line printer 66 and the like, to ensure system integrity.

Operation of the system can best be understood with reference to the flow chart of FIG. 7. Preliminarily, power switch 25 is actuated and mode switch 22 is set to either the computer or terminal position. Operation in the calculator mode is conventional and thus further description will be omitted to avoid prolixity. In the terminal mode, the user dials the telephone number of the central computer 60 and listens for a beep tone generated by the computer after the connection has been made. After receipt of the tone, portable unit 10 is attached to the telephone handset and the operator actuates A/C key 23, enters a secret account identification number and actuates the ENTER/SEND key 20. This information is formatted by microprocessor unit 32, converted into appropriate signals and transmitted over the telephone lines to central computer 60. The operator next actuates PHONE key 24, enters a telephone number which has been pre-registered in central computer 60 as the only authorized number from which securities transactions may be executed, and actuates the ENTER/SEND key 20. This information is then formatted, converted and transmitted to central computer 60. Upon receipt of both the account number and authorized telephone number, a validity check is performed at the centralized computer location. If the result of the validity check is negative, an information request is transmitted from the computer and displayed on LED display 26 requesting re-entry of this information. After receipt of the same information the second time, computer 60 performs a second validity check. If the result is still negative, the computer 60 will automatically disconnect.

If the validity check is positive, the computer 60 generates and transmits an appropriate signal, such as the two characters "OK," signifying that computer 60 is ready to accept data. The user then enters an appropriate command. For example, if the user requires a quote on a particular stock the standard stock symbol is entered by actuating appropriate ones of the character keys 11 and quote function key 13 is subsequently actuated. This information is transmitted to central computer 60 which performs a table look-up in disk storage unit 63 and transmits information identifying the stock symbol and the price or the bid price and the asking price (if the stock is traded over the counter), which information is displayed on display 26.

To execute a buy transaction, computer 60 first verifies both the account and authorized telephone numbers. The user then enters the stock symbol, and the number of shares (the latter by actuating numeric keys 12) and subsequently actuates the "buy" function key 15. In response to receipt of this information, computer 60 generates signals which are transmitted to portable unit 10 and displayed requesting the price which the user is prepared to pay for the particular stock and also a password known only to the user. Thereafter, the user endigits the price information using numeric keys 12 and a pre-registered password which can be specified as a set of digits, a set of alphabet characters, or both. Upon receipt of this information, computer 60 verifies the password and transmits back to portable unit 10 for display to the user complete information relating to the transaction, e.g. buy or sell, the number of shares, the stock symbol and the price. Upon visual verification, the user confirms the transaction by actuating the confirm function key 19 to generate a confirm function character which is transmitted to the computer 60. Upon receipt of this character, the computer responds by transmitting information which is displayed as the word "confirmed". The transaction is then terminated and unit 10 may be deactuated or placed in the calculator mode. The following is an example of a typical transaction with the system:

| | |
|---|---|
| USER: | Turn unit power on. (Power light goes on) |
| | set mode to "terminal". |
| | Dial number of remote computer. |
| | Listen for "beep". |
| | Couple unit to telephone handset |
| | Carrier light 27 lights. |
| COMPUTER: | "ID AND PHONE" |
| USER: | [A/C] 10 26 38 [SEND]   Note:[X] indicates function key |
| | [PHONE] 415-771-1146 [SEND] |
| COMPUTER: | check for validity |
| | "OK" |
| USER: | GE [QUOTE] |
| COMPUTER: | obtain info from disc (note .X means X/8) |
| | "GE" |
| | "124.5 126.5" |
| USER: | "GE 100 [BUY]" |
| COMPUTER: | "BID & PASSWORD" |
| USER: | "125.4 SPENC" |
| COMPUTER: | check password & limit |
| | "Buy 100 GE" |
| USER: | [CONFIRM] |
| COMPUTER: | "125.4" |
| USER: | [CONFIRM] |
| COMPUTER: | Place order |
| | "CONFIRMED" |
| USER: | hang up receiver |
| USER: | turn power off |

As noted above, key ROM 34 provides one level of security for the system which prevents unauthorized use of a portable unit 10. The mandatory entry of the account identification number and the authorized telephone number provides an additional level of security for the system. In addition, the password provides still another level of security for preventing unauthorized use. If additional security is desired, computer 60 may be programmed to ringback the telephone number initially specified by the user for confirmation of the order. Alternatively, a human operator at the central computer location may personally contact the authorized telephone number after the specified time period to verify the transaction.

As will now be apparent, systems constructed according to the teachings of the invention enable securities information queries to be placed by an individual investor in a convenient fashion from any location where a telephone is located and securities transactions to be made from the location of the investor's primary telephone, i.e. a business telephone at the investor's office or a home telephone. Since the instrument is small in size and light in weight and thus may be carried on the person of the user, the invention greatly expands the degree of access to securities information and securities trading for individual investors. In addition, no special or unfamiliar codes need be memorized by or carried on the person in order to identify specific securities, it being only required that the investor know the conventional security symbol. In addition, the multiple levels of security provided by the invention reduce the likelihood of unauthorized use to a minimum.

Since the usual stock salesmen and other customary brokerage personnel are bypassed with the system, securities transactions may be executed at a much lower cost, and more rapidly and efficiently. In addition, the possibility of error in effecting a securities transaction is substantially reduced by minimizing human involvement in the transaction. Further, in those types of transactions not requiring an actual order to be placed on the floor of a stock exchange, there is no restriction on the trading period: thus, transactions may be executed on a 7 day, 24 hours per day basis, if desired, by providing service personnel at the central computer location on a round the clock basis, and a data bank of buyers and sellers.

The lower cost per transaction provided by the invention further affords the opportunity for existing brokerage houses to offer a new level of service to individual investors whose annual trade in dollar volume is considered low, e.g., in the neighborhood of $50,000 or less worth of securities transactions per year. This service may take the form of leasing a portable unit 10 to an investor for a small fixed monthly rate and charging a relatively modest standard fixed fee for each transaction executed on behalf of a particular investor. Other uses for the invention will occur to those skilled in the art.

While the above provides a full and complete disclosure of the preferred embodiments of the invention, various modifications, alternate constructions and equivalents may be employed without departing from the true spirit and scope of the invention. Therefore the above description and illustrations should not be construed as limiting the scope of the invention which is defined by the appended claims.

What is claimed is:

1. A portable pocketsized securities selector unit for enabling bidirectional communication relating to securities pricing information and desired transactions with a central computer via conventional telephone lines, said securities selector unit comprising:
   a housing;
   a keyboard having a plurality of alpha character keys, digit keys and functions keys;
   processing means responsive to the actuation of said keys for generating information signals corresponding thereto;
   first means for converting said information signals to signals conformable with said telephone lines;
   second means responsive to incoming signals from said telephone lines for converting said incoming signals to electrical signals; and
   means for displaying said information signals and said electrical signals.

2. The combination of claim 1 further including enabling means detachable from said housing and electrically couplable to said information signal generating means for enabling said information signal generating means.

3. The combination of claim 2 wherein said enabling means comprises an integrated circuit containing a read only memory.

4. The combination of claim 1 wherein each said converting means comprises an acoustic coupler adapted to be coupled to the transmitter and receiver of a telephone.

5. The combination of claim 1 wherein said housing includes a central body portion having a first facing surface on which said keyboard and said displaying means are located and a pair of end portions extending away from said central body portion, said first and second converting means being positioned in said first and second end portions, respectively.

6. The combination of claim 1 wherein said first converting means includes a parallel to serial converter, means coupled to said converter for generating variable frequency signals, and means coupled to said generating means for producing variable frequency acoustical signals from said variable frequency signals.

7. The combination of claim 1 wherein said second converting means includes means responsive to variable frequency acoustical signals for generating electrical signals corresponding thereto, demodulating means for converting said corresponding electrical signals to serial digital form, and means coupled to said demodulator means for converting said digital signals from serial to parallel form.

8. The combination of claim 1 wherein said second converting means comprises means responsive to variable frequency acoustical signals for converting said acoustical signals to electrical signals corresponding thereto, and means coupled to said last name means for generating audible acoustical signals therefrom.

9. The combination of claim 1 wherein said means for generating information signals includes means responsive to the actuation of said alpha character keys corresponding to the standard alpha symbols for a given security for generating an information character corresponding thereto.

10. A portable handheld securities selector unit for use with an information transmission system in which securities pricing information may be elicited and securities transactions may be effected via a telephone, said unit comprising:
    a housing having first and second laterally spaced, elongated generally cylindrical coupler portions joined by an integral web portion having an obverse surface facing generally away from said coupler portions and a reverse surface facing generally toward said coupler portions, said first and second coupler portions having a configuration adapted to receive respectively the transmitter and receiver portions of a telephone handset;
    a keyboard mounted on said obverse surface of said web portion of said housing and having a plurality of alpha character keys, digit keys and function keys; and
    display means mounted on said obverse surface adjacent said keyboard for enabling display of said securities pricing information and information relating to said securities transactions.

11. The combination of claim 10 wherein said display means is mounted adjacent the uppermost ones of said keys.

12. The combination of claim 10 further including means mounted on said obverse surface adjacent said keyboard for receiving a removable security token.

13. The combination of claim 10 wherein said coupler portions each includes an acoustic coupler.

* * * * *